(12) United States Patent
Schwartz et al.

(10) Patent No.: US 7,477,692 B2
(45) Date of Patent: Jan. 13, 2009

(54) VIDEO ENCODING FOR SEAMLESS SPLICING BETWEEN ENCODED VIDEO STREAMS

(75) Inventors: Mayer D. Schwartz, Portland, OR (US); Jeffrey Kim Jensen, Portland, OR (US)

(73) Assignee: Tut Systems, Inc., Lake Oswego, OR (US)

( * ) Notice: Subject to any disclaimer, the term of this patent is extended or adjusted under 35 U.S.C. 154(b) by 219 days.

(21) Appl. No.: 11/610,173

(22) Filed: Dec. 13, 2006

(65) Prior Publication Data

US 2007/0140358 A1 Jun. 21, 2007

Related U.S. Application Data

(60) Provisional application No. 60/750,893, filed on Dec. 16, 2005.

(51) Int. Cl.
*H04N 7/12* (2006.01)

(52) U.S. Cl. .............................. 375/240.26; 375/240.02

(58) Field of Classification Search ................. 348/432, 348/426, 473, 584, 464, 423, 526, 705, 439, 348/441, 497, 607; 375/240, 240.25, 240.24, 375/241, 242, 342, 343, 349, 240.26, 240.12, 375/240.01, 240.02, 240.16; 370/474, 487, 370/498, 345, 527, 394; 382/232, 235

See application file for complete search history.

(56) References Cited

U.S. PATENT DOCUMENTS

| | | | |
|---|---|---|---|
| 5,652,627 A | | 7/1997 | Allen |
| 5,917,830 A | | 6/1999 | Chen et al. |
| 5,966,465 A | * | 10/1999 | Keith et al. .................. 382/232 |
| 6,480,539 B1 | * | 11/2002 | Ramaswamy .......... 375/240.03 |
| 6,529,550 B2 | * | 3/2003 | Tahara et al. ................. 375/240 |
| 2002/0080875 A1 | * | 6/2002 | Tahara et al. ........... 375/240.02 |

* cited by examiner

*Primary Examiner*—Behrooz Senfi
(74) *Attorney, Agent, or Firm*—Stewart M. Wiener (57) ABSTRACT

A method of splicing video content from a secondary encoded video stream into a primary encoded video stream, the method including the steps of identifying a splice out-time $t_{out}$ and a splice in-time $t_{in}$, at least T time after $t_{out}$, in the primary stream; causing the fullness of primary encoder's virtual buffer to be less than XB, where X is greater than 0 and less than 1, at the first decode times after $t_{out}$ and $t_{in}$; encoding the secondary stream such that an initial coded picture is transmitted in no more than $B/(XR)$ time, and encoding the second stream such that, at a final coded picture's decode time, the fullness of the secondary encoder's virtual buffer is less than XB; and replacing video content of the primary stream from $t_{out}$ through $t_{out}+T$, with the video data of the second stream.

20 Claims, 6 Drawing Sheets

ENCODER VIRTUAL BUFFER FULLNESS

VIDEO ENCODING FOR SEAMLESS SPLICING BETWEEN ENCODED VIDEO STREAMS

CROSS-REFERENCE TO RELATED APPLICATIONS

This application claims benefit of Provisional Application No. 60/750,893 filed Dec. 16, 2005, the entire disclosure of which is hereby incorporated by reference herein for all purposes.

The disclosure in copending U.S. patent application Ser. No. 11/269,498 filed Nov. 7, 2005, the entire disclosure of which is hereby incorporated by reference herein for all purposes, might be considered pertinent to the present application.

BACKGROUND OF THE INVENTION

Figure 1:
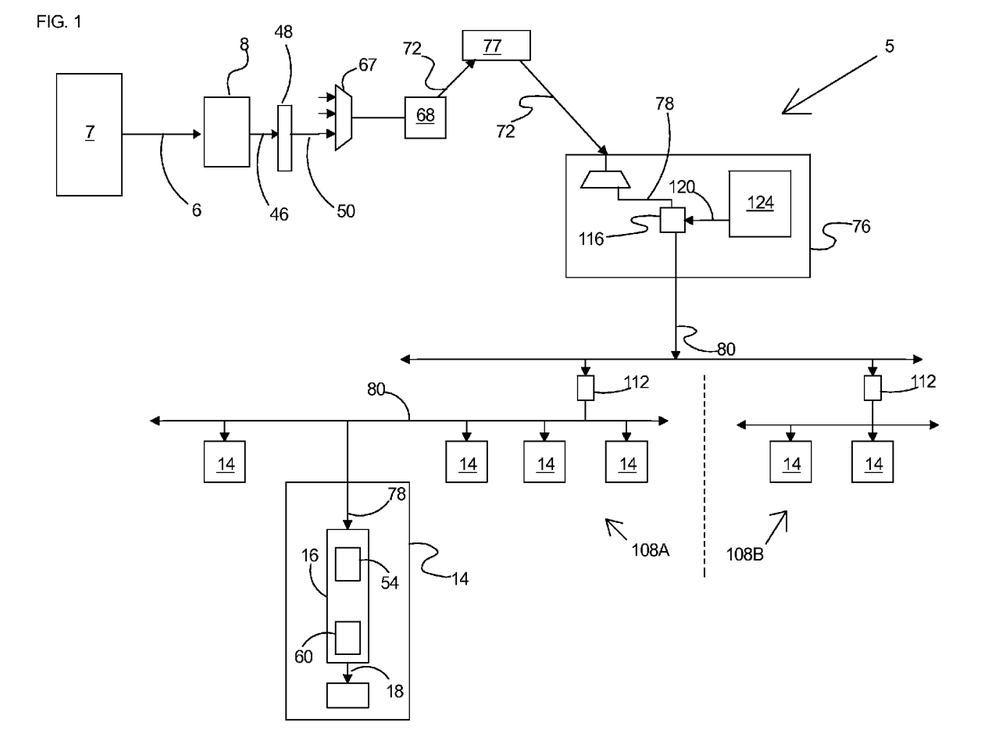
FIG. 1 is a block diagram of a conventional video transmission network.

Referring to FIG. 1, a television programming provider, such as a national satellite aggregator, typically produces a continuous set of programming signals (also known as "network feeds") for distribution by a service provider over a video transmission network 5 to a wide audience of viewers. Conventionally, the programming signal begins as an uncompressed video sequence 6 and at least one corresponding uncompressed audio sequence (not shown). The sequence 6 consists of a series of sequential pictures i and is assembled at a production facility 7.

After assembly, the uncompressed video sequence 6 is compressed by a video encoder, which may be a conventional video encoder (CVE) 8. The CVE 8 encodes each picture i (i=1, 2, . . . ) creating a corresponding coded picture (also known as an access unit) of $b_i$ bits using a conventional video coding algorithm defined by a video coding standard such as MPEG 2 or H.264. Any corresponding audio sequences are compressed by an audio encoder (not shown). The video and audio encoders are synchronized by a common clock signal.

In order to maximize coding efficiency, many modern video coding algorithms encode pictures as one of 3 different picture types: intra-coded, predictive-coded and bi-directionally predictive-coded. An intra-coded picture (or I-picture) contains a complete description of the original picture. A predictive-coded picture (or P-picture) contains a description of the picture compared to a temporally earlier reference picture. This allows the encoder to use considerably fewer bits to describe a P-picture than would be required for an equivalent I-picture. A bi-directionally predictive-coded picture (or B-picture) contains a description of the picture compared to a temporally earlier reference picture and a temporally later reference picture. This allows the encoder to use approximately an order of magnitude fewer bits to describe a B-picture than an equivalent I-picture. However, in order to use information from a temporally later picture to encode a B-picture, the temporally later picture must be encoded before the B-type picture.

Figure 2:
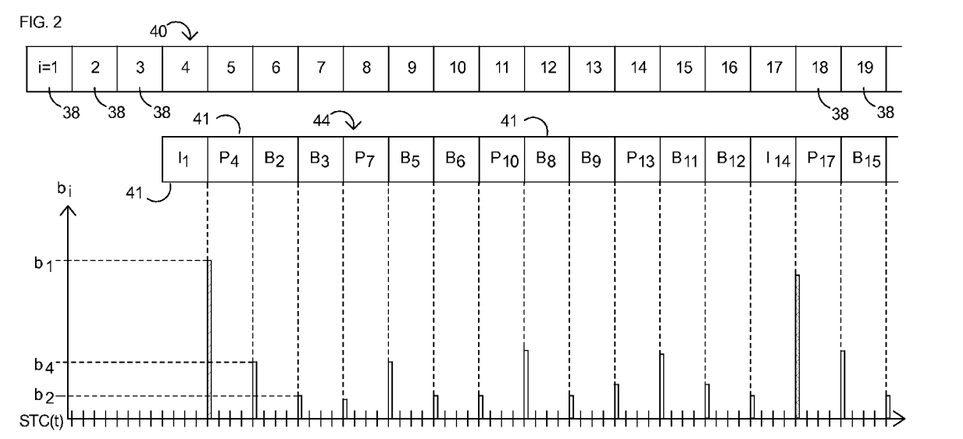
FIG. 2 shows a sequence of pictures in display order, a sequence of corresponding coded pictures in encoding order, and the relative size of the coded pictures.

Referring to FIG. 2 as an example, pictures 38 (i =1, 2, . . . 19) of a partial uncompressed video sequence are shown in display order 40 and the corresponding coded pictures 41 are shown in encode order 44. For each picture 38 the CVE determines the appropriate type for the corresponding coded picture 41 and the coded picture's place in encoding order. In the example, the CVE encodes picture 1 as an I-picture $I_1$, then picture 4 as a P-picture $P_4$ using picture 1 as a reference. Next, the CVE encodes pictures 2 and 3 as B-pictures $B_2$ and $B_3$ using picture 1 as the temporally earlier reference and picture 4 as the temporally later reference. Then picture 7 is encoded as a P-picture $P_7$, using picture 4 as a reference, pictures 5 and 6 are encoded as B-pictures $B_5$, $B_6$ using pictures 4 and 7 as the references, and so on. P-pictures and B-Pictures are said to be dependent on the picture or pictures used as reference(s).

Referring again to FIG. 1, the bits of each coded picture leave the CVE as a video elementary stream 46 at either a constant bit rate R or a variable bit rate R(t). The video elementary stream and any corresponding audio elementary streams (not shown) are input to a system encoder 48. The system encoder 48 packetizes the elementary streams into packetized elementary stream (PES) packets, each PES packet containing one or more access units of a given type. Each PES packet includes a packet header and packet data from one of the elementary streams. The PES packets are then multiplexed together and placed in transport stream (TS) packets for transmission across the network 5. For each picture i, the CVE determines the picture's playout time relative to the other pictures and relative to a system time clock (STC). The playout time is inserted into the coded picture's PES packet header in the form of a presentation time stamp (PTS). The encoder's STC is periodically sampled to generate a program clock reference (PCR) which is embedded in the transport stream containing the associated PES. A downstream decoder 16 will use a phase-locked loop to generate its own STC based on the received PCRs and thereby synchronize to the encoder's STC. The decoder then compares the PTS of each coded picture in the received transport stream to the recovered STC to determine the correct time to display the coded pictures so the audio and video playout may be synchronized.

The video and audio data packetized by the system encoder 48 represent a single program 50. After leaving the system encoder 48, the TS packets are combined with other TS packets, representing other programs, in a statistical multiplexer 67 to form a multi-program transport stream (MPTS). The MPTS is input to an up-link station 68 and used to modulate a carrier. The up-link station 68 transmits the modulated carrier 72 to a distributor head-end 76, via a satellite 77. At the head-end 76 the modulated carrier 72 is demodulated and demultiplexed, and the program 50 is re-encapsulated in a single program transport stream (SPTS) 78. The SPTS 78 is transmitted from the head-end 76 across a network 80 to customer premises over a transmission medium, such as optical fiber, copper wire, or coaxial cable. At the customer premise 14, the SPTS 78 is input to the decoder 16. The decoder 16 is often provided by the distributor (e.g. as part of a 'set-top' box (STB)). The decoder uses the SPTS 78 to generate the recreated video sequence 18.

Since dependent coded pictures depend on the unencoded reference pictures, the decoder 16 must decode the reference pictures before the dependent picture can be decoded. Therefore, although the coded pictures are transmitted, and subsequently decoded, in the encoding order 44 (FIG. 2), the downstream decoder 16 may not simply display the decoded pictures in the order they are received. For coded pictures transmitted earlier in the sequence than they are to be displayed (e.g. $P_4$ in the example shown in FIG. 2), a decode time stamp (DTS) $t_{d,i}$, relative to the STC, is inserted into the coded picture's packet header in addition to the PTS. Coded picture $P_4$ will be decoded at time $t_{d,4}$, relative to the recovered STC, and the recreated picture 4 stored in a decoded picture buffer (DPB) 60 (FIG. 1) until the picture's PTS, while using the recreated picture as a reference where necessary. For those pictures for which no reordering is necessary, assuming instantaneous decoding they can be presented (or displayed) immediately (e.g. $B_2$ and $B_3$ in FIG. 2), their DTS and PTS would be identical and therefore only the PTS is transmitted and the PTS is used to determine the decode time.

As the bits of the coded pictures stream into the decoder 16, the decoder will place the bits in the coded picture buffer (CPB) 54 until the recovered STC reaches the pictures' decode time, at which point the bits of the coded picture are instantaneously removed from the CPB 54 and decoded. The behavior of the CPB is defined by H.264 for AVC. For MPEG 2, there is an equivalent virtual buffer defined by H.262. The CVE 8 assumes the decoder's CPB 54 is of size B bits. The CVE 8 tracks the fullness of the assumed decoder CPB by maintaining its own "virtual buffer."

Figure 3:
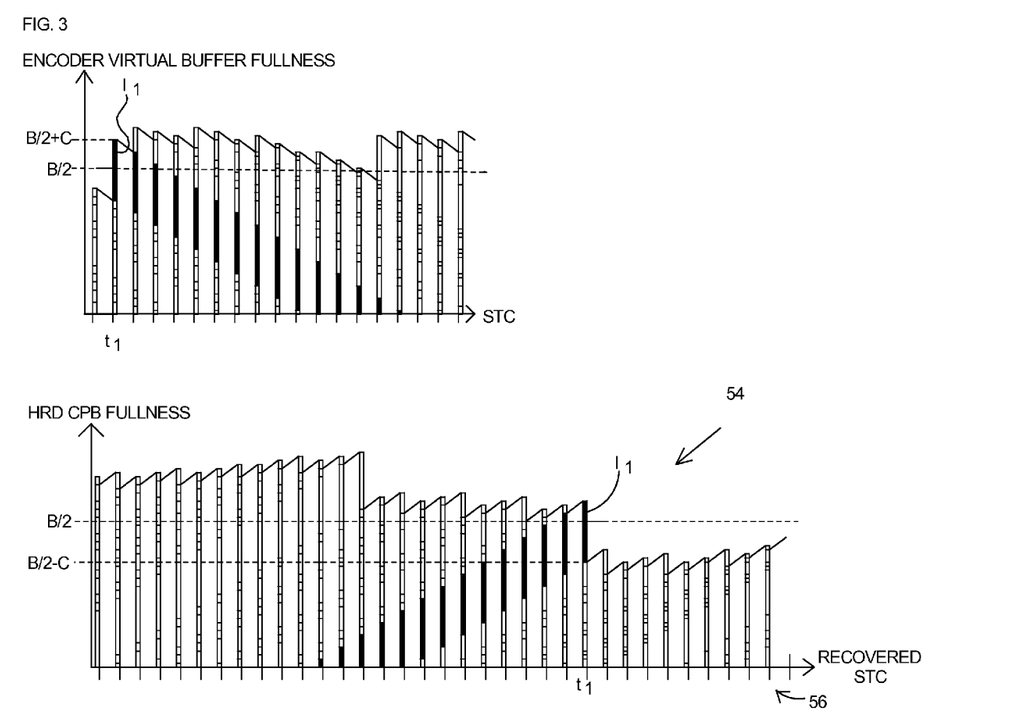
FIG. 3 is a graph showing the relationship between the fullness of a video encoder's coded picture buffer and the fullness of a downstream decoder's coded picture buffer.

FIG. 3 shows the relationship between the fullness of the encoder's virtual buffer and the decoder's CPB for the example shown in FIG. 2. It is well understood in the art that the fullness of the encoder's virtual buffer at time t with respect to the STC will mirror the fullness of the decoder's CPB 54 at time t with respect to the recreated STC. For example, at time $t_1$, relative to the encoder's STC, the encoder's virtual buffer contains (B/2)+C bits, whereas at time $t_1$, relative to the decoder's recreated STC, the decoder's CPB contains (B/2)–C bits. It is the encoder's responsibility to control the video elementary stream in order to prevent underflow of the decoder's CPB by preventing its own virtual buffer from overflowing. Underflow of the encoder virtual buffer is acceptable because generally it only results in a brief pause in data transmission.

To prevent the CPB from underflowing (or overflowing) the CVE uses a conventional rate control algorithm that controls the allocation of bits to each coded picture. In addition to controlling the buffer fullness, the rate control algorithm also works to maintain a given target bit rate R (or, for a variable bit rate system, a peak bit rate $R_p$ and some average bit rate less than $R_p$) for the program while optimizing the overall picture quality. The rate control algorithm can also interact with a statistical multiplexer to find an optimal balance between the quality of the video elementary stream and the bit rate requirements of the MPTS.

Figure 4:
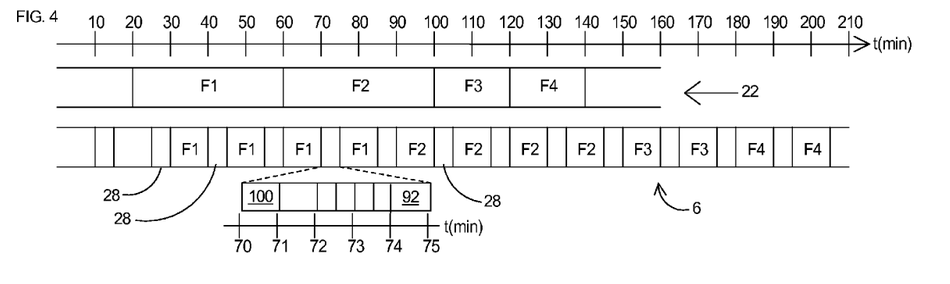
FIG. 4 is a timing diagram of video content transmitted over the video transmission network of FIG. 1.

Referring to FIG. 4, the uncompressed video sequence 6 includes feature content 22, such as episodes of recurring television programs F1, F2, F3 and F4 that are to be transmitted sequentially, interspersed with advertising content blocks 28 (i.e. one or more commercials, public service announcements, station identification messages, etc.). At the production facility (7, FIG. 1), the programming provider uses conventional video editing techniques to insert the advertising content blocks 28 into the feature content 22 at predetermined intervals, as shown at 6.

The advertising content blocks 28 that are inserted into the uncompressed video sequence 6 at the production facility typically take the form of a series of video sequences having relatively short duration (e.g. 8 distinct video sequences each having a duration of 30 seconds or 1 minute). As part of a commercial arrangement between the programming provider and the service providers, some advertising content blocks may contain some low priority advertising content 92, such as advertisements provided by the television network itself (or the block may not be full, e.g. an advertising content block may contain 4 minutes of video sequences and 1 minute of "black" 100). This allows the service providers to overwrite the low priority advertising content 92 (or the "black" data 100) in the programming signal with their own targeted advertising content. This 'ad-insertion' capability is advantageous for the service providers because they can provide targeted advertising content specifically aimed at their customer base.

Referring again to FIG. 1, the traditional approach to ad-insertion in the compressed video domain is to use a conventional transport stream splicer 116 to effect an ideally seamless splice between the content of the "primary" compressed video transport stream (i.e. the SPTS 78) and the content of a "secondary" compressed video transport stream 120 containing targeted advertising content. A "seamless" splice is invisible to a person viewing the programming signal—that is, no visual artifacts are created by the splice and the viewer is unaware he or she is not viewing content from the uncompressed video sequence 6. The secondary video transport stream 120 is usually streamed out from a video on demand (VOD) server 124. U.S. Pat. Nos. 6,678,332 and 6,792,047 describe examples of the splicing technology applicable to the conventional approach. Industry standards, such as ISO/IEC 13818-1 and ANSI/SCTE 35, may be used to define how potential splice points are identified in the SPTS 78 by the CVE 8, for instance by adding "digital cue tones" to the primary transport stream 78 temporally ahead of the splice points. Regardless of the specific means by which the potential splice points are signaled, the conventional transport stream splicer 116 detects the signals and the potential splice points and, when appropriate, splices the secondary transport stream 120 into the primary transport stream 78.

At the minimum, a conventional transport stream splicer 116, capable of effecting a seamless splice in the compressed video domain, needs to partially decode the SPTS 78, for instance to calculate buffer fullness. Because the ad-insertion needs to takes place 'on the fly' as the SPTS 10 is en route to the customer premise 14, conventional transport stream splicers are complex and computationally expensive. This precludes cost-effective implementation of conventional splicing applications as close to the customer premises as would be desirable for the service providers.

Referring again to FIG. 1, the farther downstream in the service provider network 80 the ad-insertion occurs, the more specifically the service provider can target a particular customer. For instance, if the ad-insertion occurs at the service provider's head-end 76 (as shown in FIG. 1), then all of the service provider's customers may receive and view the same targeted advertising content. If the service provider's network has multiple zones 108a, 108b the service provider may splice in different advertising in each zone, targeting the demographic characteristics of the zones, for the zones respectively at intermediate points 112 of the network 80. It is well understood in the art that, due to the nature of a compressed video transport stream, ad-insertion in the compressed video domain is not as straight forward as the process of inserting the advertising content blocks into the uncompressed video sequence.

Thus what is needed is a technique for allowing seamless splicing in the compressed video domain, anywhere in the chain between the encoder and the decoder without requiring a complex and computationally expensive splicer application. Specifically, ad-insertion would be most beneficial within the customer premise 14 therefore allowing individually targeted advertising content.

SUMMARY OF THE INVENTION

In accordance with a first aspect of the invention, there is provided a method of temporarily replacing video content from a first encoded video transport stream with video content from a second encoded video transport stream, the first and second streams being transmitted at a peak bit rate R and respectively including video data representing first and second series of coded pictures, data representing first and second reference clocks interspersed with the coded picture data, and data representing a decoding time for each coded picture, relative to the respective reference clock, the second series of coded pictures beginning with an initial coded picture and ending with a final coded picture, the second series being of duration T relative to the second reference clock, the method comprising, while encoding the first video stream by a first video encoder relative to the first reference clock, maintaining a first virtual buffer for tracking the fullness of a first hypothetical decoder's coded picture buffer (CPB) of size B receiving the first stream, at a first time, identifying a splice-out time $t_{out}$ occurring temporally after the first time and occurring in the first stream between video data representing a first coded picture and video data representing an immediately succeeding second coded picture, between the first time and the splice-out time, encoding the first stream such that, at the first coded picture's decode time, the fullness of the first virtual buffer is less than XB, where X is greater than zero and less than 1, at a second time, identifying a splice-in time $t_{in}$ occurring temporally at least T time after the splice-out time and occurring in the first stream between video data representing a third coded picture and video data representing an immediately succeeding fourth coded picture, and between the second time and the splice-in time, encoding the first encoded video transport stream such that, at the third picture's decode time, the fullness of the first virtual buffer is less than XB, while encoding the second stream by a second video encoder relative to the second reference clock, the second video encoder having a second CPB of at most size B, maintaining a second virtual buffer for tracking the fullness of a second hypothetical decoder's coded picture buffer of size B receiving the second stream, encoding the second stream such that the video data representing the initial coded picture is transmitted in no more than B/(XR) time, and encoding the second stream such that, at the final coded picture's decode time, the fullness of the second virtual buffer is less than XB, and replacing the video data in the first stream from $t_{out}$ through $t_{out}$+T, relative to the first reference clock, with the video data of the second stream from the initial picture through the final picture.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

In the following description, an embodiment of the present invention is described with respect to video encoding/decoding using the H.264 video coding standard. However, the invention is also applicable to other video coding standards, such as MPEG 2, as well as to transcoding between standards and transrating between bit rates. For the purposes of simplicity, audio will be ignored in the following discussion, although any practical implementation must address audio issues and therefore a brief discussion of audio is included at the end of this description.

Figure 5:
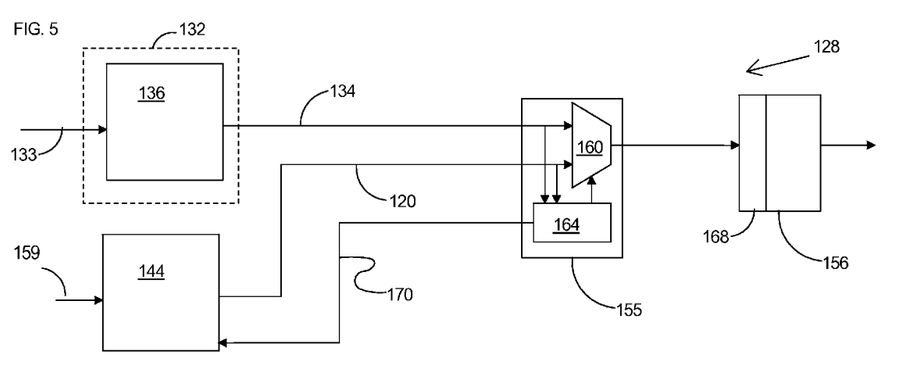
FIG. 5 is a block diagram of a video transmission network, arranged in accordance with an embodiment of the present invention.

Referring to FIG. 5, a video transmission network 128 includes a primary video source 132 for receiving a primary uncompressed video sequence 133 and creating and transmitting a primary transport stream 134. The primary video source 132 includes a primary video encoder 136 having a CPB 140. The primary video source 132 will typically be a distribution point from a large content provider to a wide audience (such as the satellite aggregator in FIG. 1). The primary video encoder 136 uses an adaptive rate control algorithm, such as the algorithm described in copending U.S. patent application Ser. No. 11/269,498 (filed Nov. 7, 2005), modified as described below. The adaptive rate control algorithm has an advantageous "look-ahead" capability which allows the adaptive rate control algorithm to adjust the bit count of the picture currently being encoded according to information about pictures that have not yet been encoded.

Still referring to FIG. 5, the video transmission network 128 also includes secondary video source 144, such as a video on demand (VOD) server. The secondary video source 144 stores a secondary transport stream 120, encoded by a secondary video encoder (not shown) including a CPB and using the adaptive rate control algorithm. The secondary video stream 120 is created from a secondary video sequence 159 of finite duration (e.g. a targeted advertising content block as described above). Both the primary video source 132 and the secondary video source 144 are coupled to a splicer 155 which is in turn coupled to a video decoder 156 which will typically be located in an STB at a customer premise. On request by the splicer 155, the secondary video source 144 outputs the secondary transport stream 120.

The splicer 155 includes a switch block 160 and a splicing control block 164. The switch block 160 is placed in a primary setting or a splicing setting, as selected by the splicing control block 164. In the primary setting the switch block 160 transmits the primary transport stream to the video decoder 156. In the splicing setting, the switch block 160 combines components of the primary and secondary transport streams to create a modified transport stream and transmits the modified transport stream to the video decoder 156. The video decoder 156 may be a conventional decoder and is assumed to be equivalent to the HRD defined by the H.264 standard, having a CPB 168 of B bits.

When the video transmission network 128 is operational it will generally be desirable for the video decoder 156 to receive the unmodified primary transport stream 134. Therefore, under normal conditions, the switch block 160 will be in the primary setting and the secondary video source 144 will await notification from the splicing control block 164. However in certain situations, described in detail below, the splicing control block 164 will send a notification signal 170 to the secondary video source 144, the secondary video source will begin transmitting a secondary transport stream 120 to the splicer 155, and the splicing control block will place the switch block 160 in the splicing setting. The splicer 155 will then replace the coded pictures of the primary transport stream 134 with the coded pictures of the secondary transport stream 120, while other components of the primary transport stream, such as PES packet headers (which contain the time stamps), are left intact, thereby creating the modified transport stream. Thus the viewable content of the secondary transport stream is spliced into the primary transport stream. At the end of the secondary transport stream 120, the splicing control block 164 will place the switch block 160 back in the primary setting, thereby resuming the transmission of the unaltered primary transport stream 134 to the video decoder 156.

The secondary video encoder (not shown) generally operates in a similar manner as the primary video encoder 136. At some time prior to the time the secondary transport stream is needed, the secondary video encoder receives a secondary, uncompressed video sequence and encodes it, thereby creating the secondary video transport stream 120. The secondary video transport stream is then stored in the secondary video source 144 until the splicer 155 requests it. Depending on the location of the splicer 155, the secondary video source 144 may be located anywhere upstream of the decoder 156, such as the distributor head-end (76, FIG. 1) or the customer's STB.

Figure 6:
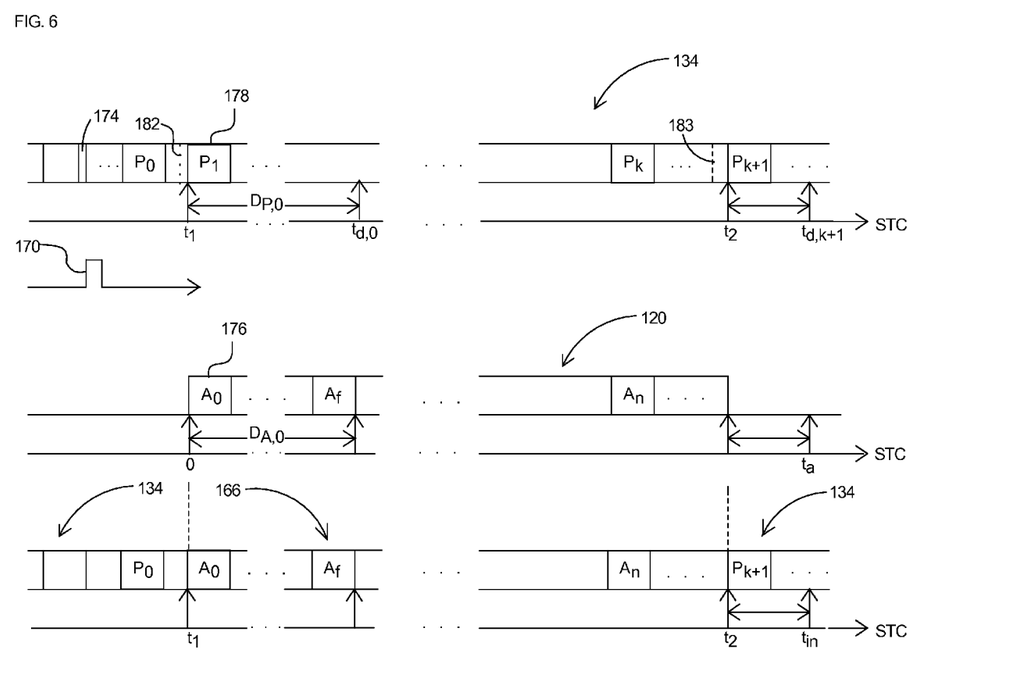
FIG. 6 is a packet-level timing diagram of a primary video stream and a secondary video stream encoded in accordance with an embodiment of the present invention.

FIG. 6 shows the signals being input to and output from the splicer during a splice. The video data payloads of primary transport stream packets are denoted by $P_s$ (where s=0, 1, . . . , k, k+1, . . . ). The video data payloads of secondary transport stream packets are denoted $A_i$ (where i=0, 1, . . . , n). As described above in regards to conventional splicing techniques, advance notice of an upcoming splice point 182 must be provided to the splicer, for instance via a flag 174 in the primary transport stream 134. The splicer may then send a request 170 to the secondary video source to begin transmitting the secondary transport stream 120 such that the secondary transport stream's first packet 176 arrives at the splicer no later than the first packet 178 of the first coded picture of the primary transport stream to be replaced. The splicer will then replace the payload of each packet in the primary transport stream 134 with the payload from packets in the secondary transport stream 120, while leaving the primary transport stream packet headers intact, thereby creating a modified transport stream 166 which is transmitted to the decoder.

Two types of potential splice points are identified, splice out-points and splice in-points. A splice out-point indicates a point in the sequence of bits making up the primary transport stream when it would be potentially possible to begin replacing subsequent primary coded pictures with secondary coded pictures in the splicer 155. Thus, the last primary coded picture before the splice out-point is the last primary coded picture received by the decoder prior to the modified transport stream. A splice in-point indicates a point in the sequence of bits making up the primary transport stream when it would be potentially possible for the splicer to stop replacing the primary coded pictures with the secondary coded pictures. Thus, the last primary coded picture before the splice in-point is the last primary coded picture to be overwritten by the splicer 155. There may be multiple splice in-points for a given splice out-point to support various durations of the secondary transport stream.

The encoding of both the primary and secondary transport streams is constrained by the rate control algorithms of the respective encoders in a manner that allows the splicer to splice seamlessly between the two transport streams without having to recalculate the HRD CPB fullness. For each potential splice point in the primary video stream, constraints are applied to the encoding of the coded pictures in the temporal vicinity of the splice point to eliminate the risk of decoder buffer underflow if the splice is made. Decoder buffer underflow occurs when the decoder has no bits available to decode, resulting in a frame being repeated. Decoder buffer overflow is acceptable because the decoder has bits to decode and can wait before loading in more bits from its decoder buffer. The constraints are:

1. A splice out of the primary transport stream must occur at a point in the primary transport stream where the splice will not interfere with dependencies between the coded pictures. Therefore the primary coded picture immediately succeeding a splice out-point in decoding order must be, in the case of H.264, an IDR picture or, for MPEG-2, the first picture of a closed group of pictures. Thus, in the example picture sequence shown in FIG. 2, a splice could be made after coded picture $B_{12}$, making the point immediately after coded picture $B_{12}$ (and before coded picture $I_{14}$) a splice-out point.

2. At the decode time of a coded picture preceding a splice out-point, the fullness of the video encoder's virtual buffer must be less than or equal to XB (where B is the assumed size of the decoder's CPB, X is a known value less than 1, and is preferably equal to ½). It will be apparent to those skilled in the art that if the primary video encoder's virtual buffer fullness is less than or equal to XB at time $t_{d,12}$ (relative to the encoder's STC) the decoder's CPB fullness will be greater than or equal to B-XB at time $t_{d,12}$ (relative to the decoder's recovered STC) To accomplish this, the adaptive rate control algorithm utilized by the primary video source is modified to use its look-ahead feature to detect potential splice-out points in the primary transport stream and, if necessary, adjust the bit counts of the primary coded pictures preceding each potential splice-out point to force the primary video encoder's virtual buffer fullness to less than or equal to XB.

Using the primary video encoder's rate control algorithm to control the encoder's CPB fullness is not in itself sufficient to protect the decoder's CPB from underflow at a splice out-point. Additionally, the following constraints must be met during the encoding of the secondary video stream:

3. To complement constraint 2, the adaptive rate control algorithm utilized by the secondary video source is modified to force the initial CPB delay for the first coded picture of the secondary transport stream to be less than or equal to XB/R. That is, the first coded picture of the secondary transport stream must be small enough such that it will take no more than XB/R time for the first coded picture of the secondary transport stream to be completely loaded into the decoder's CPB. It will be apparent to those skilled in the art that, as a result of constraints 2 and 3, underflow of the decoder's CPB as a result of the splice out is avoided.

4. A splice back in to the primary stream must also occur at a point in the primary transport stream where no primary coded pictures corresponding to reference pictures will have been overwritten by secondary coded pictures. For instance, in the example shown in FIG. 2, if coded picture $B_3$ were used as a splice in-point, none of the subsequent coded pictures dependent on coded picture $I_1$ could be decoded because coded picture $I_1$ would have been overwritten with a secondary picture. Therefore the primary coded picture immediately succeeding a splice in-point in decoding order must be an IDR picture for H.264 or the first picture of a closed GOP for MPEG-2, completely equivalent to constraint 1.

5. Similarly to constraint 2, the fullness of the secondary video encoder's virtual buffer must be forced to be less than or equal to XB at the decode time of the final secondary coded picture relative to the encoder's STC, thus forcing the decoder's CPB fullness to be greater than or equal to B-XB at the decode time of the final secondary coded picture relative to the decoder's STC.

6. To complement constraint 5, at the decode time of a coded picture preceding a splice in-point, the fullness of the primary video encoder's CPB must be less than or equal to XB. The adaptive rate control algorithm utilized by the primary video source is modified to use its look-ahead feature to detect potential splice-in points in the primary transport stream and adjust the bit counts of the primary coded pictures preceding each potential splice-in point to force the primary video encoder's CPB fullness to be less than or equal to XB.

7. The duration of the secondary transport stream must be no greater than the time between the splice in-point and the splice out-point. Preferably the duration of the secondary transport stream is equal to the time between the splice out-point and the splice in-point, but if the duration of the secondary transport stream is less than the time between splice points the splicer 155 may insert replacement coded pictures, such as black coded pictures, into the modified transport stream between the final coded picture of the secondary transport stream and the primary coded picture corresponding to the splice in-point.

Constraints 1, 2, and 3 ensure that the splice from the primary transport stream to the secondary transport stream will be seamless to a person viewing the output of the video decoder. Constraints 4, 5, and 6 ensure that the splice back to the primary transport stream will also be seamless.

Referring again to FIG. 6, transport stream packet $P_0$ is the last packet preceding a splice out-point 182 and belonging to a coded picture having a DTS of $t_{d,0}$. Transport stream packet $P_1$ is the first packet of an IDR picture and corresponds to PCR time $t_1$ relative to the STC (there may be packets containing non-video data between $P_0$ and $P_1$). Secondary transport stream packet $A_0$ belongs to the first picture of the secondary transport stream. Constraints 1, 2, 4 and 6 also guarantee that if no splice is taken, the output of the video decoder will show no indication of the potential splice points.

When a splice out is performed, packet $P_1$ will be the first primary transport stream packet to be replaced by data from the secondary transport stream. If, in accordance with constraint 2, the primary rate control algorithm has forced the primary video encoder's virtual buffer fullness to less than or equal to XB at $P_0$'s decode time, then, absent a splice, the delay $D_{p,0}$ between the time $t_1$ that packet $P_1$ enters the decoder's CPB and the time $t_{d,0}$ that the preceding coded picture is removed from the decoder's CPB will be equal to at least XB/R time.

If the first coded picture, beginning with packet $A_0$ and ending with packet $A_f$, of the secondary transport stream, is encoded in accordance with constraint 3 then the delay $D_{A,0}$ between packet $A_0$ entering the decoder CPB and packet $A_f$ entering the decoder CPB will be no more than XB/R and it is therefore ensured that all packets of the first coded picture will have entered the decoder's CPB before time $t_{d,0}$.

Still referring to FIG. 6, packet $P_k$ is the last packet preceding a splice in-point 183 and therefore is the last primary transport stream packet to be replaced by the secondary transport stream. Packet $P_{k+1}$ corresponds to time $t_2$ relative to the STC and is the first packet of an I-picture having a decode time of $t_{d,k+1}$. Packet $P_{k+1}$ is the first primary transport stream packet not to be replaced by the secondary transport stream (there may be packets containing non-video data between $P_k$ and $P_{k+1}$). Secondary transport stream packet $A_n$ is the last packet of the last coded picture of the secondary transport stream.

If the secondary and primary transport streams have been encoded in accordance with constraints 5 and 6 respectively, the fullness of the decoder's CPB will be at least B-XB at the decode time of the last coded picture of the secondary transport stream and the primary transport stream will have been encoded such that the first coded picture after the splice-in point will be expecting the decoder buffer fullness to be at least B-XB.

One can readily see that application of the above described constraints ensures that the amount of space required for the secondary transport stream is available in the primary transport stream.

Figure 7:
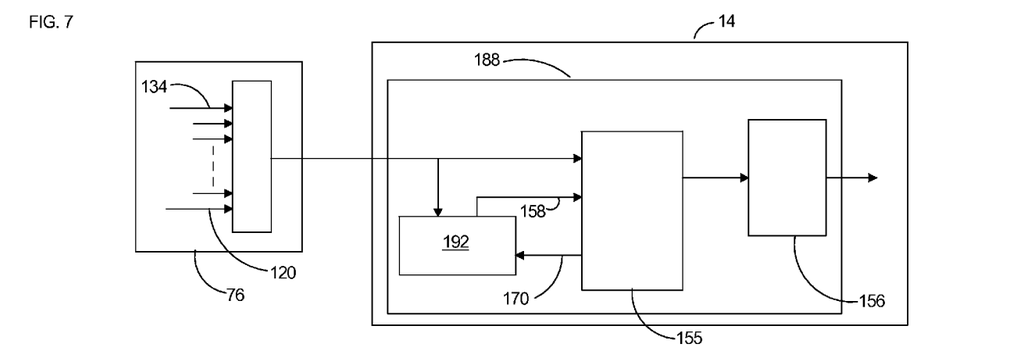
FIG. 7 is a block diagram of a video transmission network, arranged in accordance with an embodiment of the present invention.

Referring to FIG. 7, in a preferred embodiment of the invention, the splicer 155 is located in a customer's STB 188 and multiple transport streams are pre-encoded as possible secondary transport streams at another location, such as the distributor head end 76, and transferred to the STB 188, for instance by using a conventional method such as FTP. The transport streams are then stored in a memory block 192. When the splicer 155 is required to enter the splicing setting, a request 170 is sent to the memory block 192 and the memory block streams out a secondary transport stream. The memory block 192 may select one of the multiple transport streams to stream out at random or in some predetermined sequence. Alternatively, some selection parameter, based, for example, on the programming content or origin of the primary transport stream or demographic characteristics of the customer, may be used in selecting which transport stream to transmit to the splicer 155.

Figure 8:
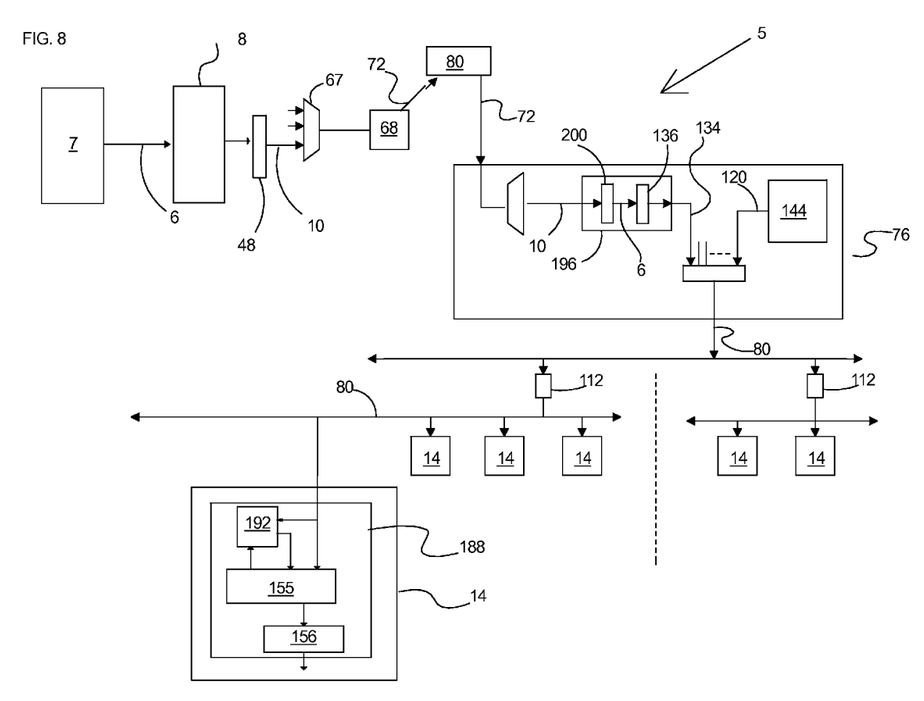
FIG. 8 is a block diagram of a video transmission network, arranged in accordance with an embodiment of the present invention.

Referring to FIG. 8, in another embodiment of the invention, the constraints do not have to be applied to the primary video stream by the programming provider. The primary video stream may be encoded conventionally by the programming provider and transcoded or transrated by the distributor at a location, such as the distributor head-end 76, to comply with the constraints of the present invention. At the head-end 76, the SPTS 10 is input to a transcoder (or transrater) 196. The transcoder 196 contains a decoder 200, which recreates the original uncompressed video sequence 6. The transcoder 196 also contains a primary video encoder 136. The primary video encoder 136 receives the recreated video sequence and creates the primary transport stream 134 while applying the constraints in the manner described above.

An embodiment of the present invention allows secondary transport streams to be spliced into a primary transport stream that has been encrypted. The secondary transport stream itself is not required to be encrypted. Such insertion into a previously encrypted stream assumes that video PES headers are not encrypted, for instance as indicated by the PES_scrambling_control bits of a PES header, that the descrambler will detect the difference between encrypted and non-encrypted video, for instance as indicated in the transport_scrambling_control bits of a TS packet header, and that the scrambler works at video frame boundaries.

In many practical deployments of embodiments of the present invention, such as advertisement insertion, the ability to verify that the secondary transport stream played out correctly is an important feature. By pre-encoding the video sequences (e.g. advertisements), the resulting access units may be hashed and the hash value stored in the first PES header of the secondary transport stream in the reserved bits signaled by PES_extension_flag='1' and PES_extension_flag_2='1'. Along with the hash value, the length of the ad in 90 kHz clock ticks is also stored. Room for these bits (hash value and ad length) can be reserved in the primary transport stream by the primary video encoder whenever a potential splice point is detected. A one-way or cryptographic hash function is used to generate the hash value as a way of verifying the integrity of the ad. For example, either SHA-1 or MD5 can be used as such a hash function. SHA-1 generates a 160 bit hash value while MD5 generates a 128 bit hash value.

As far as audio is concerned, audio PES packets (in the primary stream) whose audio frames have presentation times that "cover" to any extent the time interval from $t_{out}$ to $t_{in}$ are replaced with audio frames in the ad which are "contained" to the interval $t_{out}$ to $t_{in}$. This simple scheme will introduce at most a few milliseconds of audio silence at splice points.

It will be appreciated from the foregoing that the primary video encoder 136 builds a primary transport stream under a set of constraints such that, if a secondary transport stream is built under a set of complementary constraints, then a very simple application, suitable for implementation on a STB, can easily splice the secondary transport stream into the previously encoded primary transport stream. This allows a distributor, for example, to pre-encode an advertising content block targeted at a specific customer, store the encoded advertising content block on the customer's STB and splice the encoded advertising content block into a network feed by temporarily replacing the network feed with the targeted advertising block without interrupting the customer's viewing experience.

Embodiments of the present invention advantageously allow advertising content to be inserted into the primary video stream anywhere in the network between the primary video source and the decoder, including within a customer's set-top box, without the need for a computationally expensive and complex splicing application.

It will be appreciated that the invention is not restricted to the particular embodiment that has been described, and that variations may be made therein without departing from the scope of the invention as defined in the appended claims and equivalents thereof.

The invention claimed is:

1. A method of temporarily replacing video content from a first encoded video transport stream with video content from a second encoded video transport stream, the first and second streams being transmitted at a peak bit rate R and respectively including video data representing first and second series of coded pictures, data representing first and second reference clocks interspersed with the coded picture data, and data representing a decoding time for each coded picture, relative to the respective reference clock, the second series of coded pictures beginning with an initial coded picture and ending with a final coded picture, the second series being of duration T relative to the second reference clock, the method comprising:

A) while encoding the first video stream by a first video encoder relative to the first reference clock:
   maintaining a first virtual buffer for tracking the fullness of a first hypothetical decoder's coded picture buffer (CPB) of size B receiving the first stream,
   at a first time, identifying a splice-out time $t_{out}$ occurring temporally after the first time and occurring in the first stream between video data representing a first coded picture and video data representing an immediately succeeding second coded picture,
   between the first time and the splice-out time, encoding the first stream such that, at the first coded picture's decode time, the fullness of the first virtual buffer is less than XB, where X is greater than zero and less than 1,
   at a second time, identifying a splice-in time $t_{in}$ occurring temporally at least T time after the splice-out time and occurring in the first stream between video data representing a third coded picture and video data representing an immediately succeeding fourth coded picture, and
   between the second time and the splice-in time, encoding the first encoded video transport stream such that, at the third picture's decode time, the fullness of the first virtual buffer is less than XB, B) while encoding the second stream by a second video encoder relative to the second reference clock, the second video encoder having a second CPB of at most size B:
   maintaining a second virtual buffer for tracking the fullness of a second hypothetical decoder's coded picture buffer of size B receiving the second stream,
   encoding the second stream such that the video data representing the initial coded picture is transmitted in no more than B/(XR) time, and
   encoding the second stream such that, at the final coded picture's decode time, the fullness of the second virtual buffer is less than XB, and C) replacing the video data in the first stream from $t_{out}$ through $t_{out}$+T, relative to the first reference clock, with the video data of the second stream from the initial picture through the final picture.

2. A method according to claim 1, wherein the method further comprises:
   while encoding the first stream, inserting a marker in the first stream between the first time and the splice-out time,
   monitoring the first stream for the marker, and
   upon receiving the marker, sending a notification signal to a source of the second stream, the notification signal causing the source to provide the second stream, and
   wherein the marker is placed at a point in the first stream such that the second stream will be provided no later than the splice-out time.

3. A method according to claim 1, wherein X equals ½, the second coded picture is encoded independently of all other coded pictures, all coded pictures subsequent to the second coded picture are encoded independently of all coded pictures that preceded the second coded picture, the fourth coded picture is encoded independently of all other coded pictures, and all coded pictures subsequent to the fourth coded picture are encoded independently of all coded pictures that preceded the fourth coded picture.

4. A method according to claim 1, the method further comprising encoding the second stream prior to encoding the first stream and storing the second stream in a storage device.

5. A method according to claim 4, wherein the method further comprises:
   while encoding the first stream, between the first time and the splice-out time, inserting a marker in the first stream,
   monitoring the first stream for the marker, and
   upon receiving the marker, sending a notification signal to the storage device, the notification signal causing the storage device to transmit the second stream, and
   wherein the marker is placed at a point in the first stream such that the second stream will be transmitted no later than the splice-out time.

6. A method according to claim 5, wherein the second stream is one of a plurality of encoded video streams stored on the storage device, each of the plurality of encoded video streams having been encoded according to step B, and the method further comprises providing at least one selection parameter to the storage device and selecting one of the plurality of encoded video streams as the second stream, the selection being at least partially determined by the selection parameter.

7. A method according to claim 6, wherein at least one selection parameter provided by the splicer relates to a destination of the first stream.

8. A method according to claim 1, wherein step A further comprises:
for each of a plurality of times relative to the first reference clock, identifying a potential splice-out time occurring temporally after each of the plurality of times and occurring in the first stream between video data representing a potential first coded picture and video data representing an immediately succeeding, potential second coded picture, and
between each of the plurality of times and the respective potential splice-out time, encoding the first stream such that, at the decode time of each of the potential first coded pictures, the fullness of the first virtual buffer is less than XB, and
the method further comprises:
selecting one of the potential second pictures to be the second picture of step C.

9. A method according to claim 8, wherein each potential second coded picture is encoded independently of all other coded pictures, all coded pictures subsequent to the potential second coded pictures are encoded independently of all coded pictures that preceded each potential second coded picture, each potential fourth coded picture is encoded independently of all other coded pictures, and all coded pictures subsequent to the potential fourth coded pictures are encoded independently of all coded pictures that preceded each potential fourth coded picture.

10. A method according to claim 9, wherein each potential second coded picture is encoded independently of all other coded pictures and all subsequent coded pictures are encoded independently of all coded pictures that preceded each potential second coded picture.

11. A method according to claim 1, wherein step A further comprises:
for each of a plurality of times relative to the first reference clock, identifying a potential splice-in time occurring temporally after each of the plurality of times and occurring in the first stream between video data representing a potential third coded picture and video data representing an immediately succeeding, potential fourth coded picture, wherein each potential fourth coded picture is encoded independently of all other coded pictures and all coded pictures subsequent to each potential fourth coded picture are encoded independently of all coded pictures that precede the respective potential fourth coded picture, and
between each of the plurality of times and the respective potential splice-in time, encoding the first stream such that, at the decode time of each of the potential third coded pictures' decode time, the fullness of the first virtual buffer is less than XB, and
the method further comprises:
selecting one of the potential fourth pictures to be the fourth picture of step C.

12. A method according to claim 1, wherein if tin occurs more than T time after $t_{out}$, the method further comprises appending video data representing replacement coded pictures to the second stream for $t_{in}$-$t_{out}$-T time after the final coded picture.

13. A method according to claim 1, wherein the second encoded video stream is an encoded version of a television commercial.

14. A method according to claim 1, wherein the second encoded video stream is an encoded version of at least two television commercials.

15. A method according to claim 1, wherein step A further comprises encrypting the video data of the first encoded video stream, wherein each coded picture of the first encoded video stream is encrypted independently of the other coded pictures of the first encoded video stream.

16. A method according to claim 1, wherein step B further comprises using a hashing function to generate a hash value for the second encoded video stream and inserting the hash value into the second stream.

17. A method according to claim 1, wherein the first video encoder is a stand alone video encoder.

18. A method according to claim 1, wherein the first video encoder is an encoding stage of a transcoder.

19. A method according to claim 1, wherein the first video encoder is an encoding stage of a transrater.

20. A method according to claim 1, wherein X equals ½.

* * * * *

UNITED STATES PATENT AND TRADEMARK OFFICE
CERTIFICATE OF CORRECTION

PATENT NO. : 7,477,692 B2
APPLICATION NO. : 11/610173
DATED : January 13, 2009
INVENTOR(S) : Schwartz et al.

Page 1 of 1

It is certified that error appears in the above-identified patent and that said Letters Patent is hereby corrected as shown below:

In Column 14, Line 19, in Claim 12, delete "tin" and insert -- $t_{in}$ --

Signed and Sealed this

Eleventh Day of August, 2009

David J. Kappos
*Director of the United States Patent and Trademark Office*